United States Patent

Kosaka et al.

Patent Number: 5,537,867
Date of Patent: Jul. 23, 1996

[54] PNEUMATIC DETECTION APPARATUS FOR A TIRE WHICH UTILIZES PRESSURE-SENSITIVE DISPLACEMENT OF AN INTERNAL MAGNET

[75] Inventors: Katsuji Kosaka, Anjo; Tsukasa Menjou, Toyoake; Norihisa Itoh, Anjo, all of Japan

[73] Assignee: Nippondenso Co., Ltd., Kariya, Japan

[21] Appl. No.: 467,120

[22] Filed: Jun. 6, 1995

[30] Foreign Application Priority Data

Jun. 6, 1994 [JP] Japan ................... 6-124080

[51] Int. Cl.$^6$ ............... B60C 23/02; B60C 23/00
[52] U.S. Cl. ........................ 73/146.5; 340/448
[58] Field of Search ............ 73/146.5; 340/444, 340/448, 499

[56] References Cited

U.S. PATENT DOCUMENTS

| | | | |
|---|---|---|---|
| 4,300,120 | 11/1981 | Surman | 73/146.5 |
| 4,588,978 | 5/1986 | Allen | 73/146.5 |
| 4,597,286 | 7/1986 | Aguglia | 73/146.5 |
| 4,749,993 | 6/1988 | Szabo et al. | 73/146.5 |
| 5,260,683 | 11/1993 | Tanaka et al. | 340/448 |
| 5,261,273 | 11/1993 | Imani et al. | |
| 5,301,553 | 4/1994 | Schultz et al. | 73/146.5 |

FOREIGN PATENT DOCUMENTS

| | | |
|---|---|---|
| 52-28383 | 7/1977 | Japan |
| 59-72211 | 4/1984 | Japan |
| 4-8609 | 1/1992 | Japan |
| 4-46808 | 2/1992 | Japan |
| 6293205 | 10/1994 | Japan |

*Primary Examiner*—Richard Chilcot
*Assistant Examiner*—William L. Oen
*Attorney, Agent, or Firm*—Cushman, Darby & Cushman

[57] ABSTRACT

A magnetic-flux change-generating device 2 causes amplitude modulation of alternating magnetic flux in accordance with displacement of a movable body, and an amplitude-compensating device (low-pass filter) 4 causes attenuation of amplitude of electromagnetic-induction voltage of a pickup coil 3 substantially proportionally to frequency. When frequency of the alternating magnetic flux (also termed "carrier frequency") fluctuates, the amplitude of the electromagnetic-induction voltage fluctuates in proportion to the frequency, but because the amplitude of the electromagnetic-induction voltage is caused to be attenuated at an attenuation rate which is substantially proportional to the frequency, displacement can be detected accurately by this amplitude change, irrespective of change in the frequency of the alternating magnetic flux (i.e., the carrier frequency of the electromagnetic-induction voltage).

14 Claims, 6 Drawing Sheets

PNEUMATIC DETECTION APPARATUS FOR A TIRE WHICH UTILIZES PRESSURE-SENSITIVE DISPLACEMENT OF AN INTERNAL MAGNET

CROSS REFERENCE TO RELATED APPLICATION

This application is based upon and claims priority from Japanese Patent Application No. Hei. 6-124080 filed Jun. 6, 1994, the contents of which are incorporated herein by reference.

BACKGROUND OF THE INVENTION

1. Field of the Invention

The present invention relates to a pneumatic detection apparatus for a tire, and more particularly, to a pneumatic detection apparatus for a tire employing a detection device to detect change in tire air pressure as change in magnetic flux.

2. Related Art

An electromagnetic-induction type displacement detection apparatus provided with a magnetic-flux change-generating device which is interlocked with a movable body to be a detected object and which causes an amount of magnetic flux linked to a pickup coil to change in accordance with this displacement has the advantage of being able to detect, without touching the moving body, displacement thereof. A device employing this electromagnetic-induction type displacement detection apparatus as a device to detect air pressure of a tire is disclosed in Japanese examined patent publication No. 52-28383.

The structure of this prior art is such that, in a case where a permanent magnet incorporated within a tire as a magnetic-flux change-generating device is displaced by change in tire air pressure, the displacement thereof is detected by a pickup coil installed on the vehicle side. More specifically, the structure is the such that magnetic poles of the permanent magnet incorporated within the tire and facing the pickup coil are inverted when tire air pressure has diminished. The phase of a carrier signal (alternating current) generated by the pickup coil at each revolution of the tire is reversed by this change in polarity, and diminishment of tire air pressure is detected thereby.

According to this structure, however, signals are only determined in a binary manner; subtle change such as when, for example, tire air pressure diminishes gradually cannot be detected. For this reason, change in tire air pressure cannot be predicted in advance. With regard to this problem, it is conceivable that diminishment of tire air pressure could be detected by detecting the amplitude of detection voltage electromagnetically inducted to the pickup coil by magnetic flux during inversion of the magnet. In the carrier signal output with each revolution of the tire and detected by this pickup coil, however, the frequency thereof becomes high and the amplitude thereof also increases due to increase in the rotational speed of the tire. This is because the signals output from the pickup coil are dependent on the speed of the magnetic flux traversing the pickup coil; i.e., on the movement speed of the magnet. In this way, amplitude change of the carrier signal accompanying rotation of the tire is overlaid on amplitude change corresponding to the original amount of diminishment of the tire air pressure. As a result of this, it was difficult to determine the amount of diminishment of tire air pressure on the basis of the amplitude of the signal electromagnetically inducted to the pickup coil.

SUMMARY OF THE INVENTION

In light of the foregoing problems, it is an object of the present invention to provide a pneumatic detection apparatus for a tire capable of accurately detecting amount of diminishment of tire air pressure irrespective of change in tire revolving speed, that is to say, vehicle speed.

To solve the above-described problems, an invention according to a first aspect detects change in air pressure of a tire as change in magnetic flux, outputting a signal which changes in accordance with the amount of change in magnetic flux thereof, and also discriminates, by a discriminating device, pressure values of the air pressure as a plurality of values in accordance with this signal. Consequently, it becomes possible to discriminate, across a plurality of stages, a state of tire air pressure which priorly could be discriminated only in a binary manner.

Additionally, the pressure-detecting device can be structured so as to have a pressure sensor composed of a magnet of which position changes in accordance with the change in tire air pressure and a magnet of which magnetic pole position changes in accordance with the magnetism of the foregoing magnet. When this structure is employed, it becomes possible accurately detect tire pressure with a simple structure.

Furthermore, in an invention according to a third aspect, a compensating device compensates an amount of change in signal amplitude due to tire revolving speed with respect to a signal the frequency and amplitude of which change in accordance with change in tire air pressure and with tire revolving speed. Elimination of the amount of amplitude changed by tire rotational speed and extraction of only at the amount of change of amplitude corresponding to tire pressure become possible.

Moreover, in an invention according to a fourth aspect, the amplitude-compensating device is structured by a frequency-filter device having attenuation characteristics with respect to a predetermined frequency range. In this case, the signal can be made to be a magnitude of a uniform level irrespective of frequency, and performance of stabilized discrimination becomes possible.

In an invention according to a fifth aspect, an output signal can be made to have a magnitude of a uniform level in spite of an input signal of a nature whereby the magnitude thereof becomes larger along with frequency, and stabilized output signal can be obtained irrespective of frequency. Conversely, conversion to a signal the magnitude of which becomes smaller as frequency of a signal the magnitude of which does not change due to frequency becomes larger is also possible.

In an invention according to a sixth aspect, an output signal can be made to have a magnitude of a uniform level in spite of an input signal of a nature whereby it has two or more frequency bands and whereby the signal becomes larger or smaller due to the frequency bands thereof. Conversely, an output signal the magnitude of which becomes larger or smaller in keeping with a frequency in the frequency bands thereof can also be obtained.

An invention according to a seventh aspect can be made so as not to perform further amplification with respect to a signal of a frequency which is larger or smaller than an assumed frequency band of an input signal, and excessive output to circuitry employed in a later stage can be prevented.

When a frequency of alternating magnetic flux (also termed "carrier frequency") changes, the amplitude of the electromagnetic-induction voltage varies in proportion to the frequency thereof. In the invention according to an eight aspect, however, the amplitude of electromagnetic-induction voltage is caused to attenuate at an attenuation rate substantially proportional to the frequency, and so the amplitude of electromagnetic-induction voltage scarcely changes and displacement can be detected accurately by this amplitude change, irrespective of change in the frequency of the alternating magnetic flux (i.e., the carrier frequency of the electromagnetic-induction voltage).

In an invention according to a ninth claim, the carrier frequency of alternating magnetic flux of the invention according to the eighth claim is further established within an attenuation band of a low-pass filter which attenuates output signal amplitude substantially proportionally to the frequency, and so the amplitude-compensating device can be structured by a simple low-pass filter.

In an invention according to a tenth claim, the attenuation rate of the invention according to the eighth claim is further established within a range of 0.5K to 2K, when K is a predetermined proportional constant value in the carrier signal band to be detected. For this reason, amplitude of electromagnetic-induction voltage can be made to be substantially uniform irrespective of fluctuation in carrier signal frequency in this carrier signal band to be detected, and as a result of this, displacement due to the amplitude of the electromagnetic-induction voltage can accurately be detected.

In an invention according to an eleventh claim, the amplitude-compensating device of the invention according to the eighth claim is further structured by an integrating circuit which negatively feeds back output voltage through a parallel feedback circuit of a shunt resistance Rs and a return capacitance C, and the carrier frequency f is established at a value larger than $fc=1/(2\pi RsC)$. Consequently, saturation can be prevented and linear amplification can be performed with respect to the low-frequency component or direct-current component of the electromagnetic-induction voltage smaller than fc (including the changing frequency of the amount of linkage magnetic flux due to displacement of the moving body); meanwhile, the amplitude thereof can be attenuated substantially proportional to the magnitude of the carrier frequency with respect to the frequency component larger than fc (including the frequency of alternating magnetic flux, i.e., the carrier frequency).

In an invention according to a twelfth or thirteenth claim, a rotating magnet is rotated by a composite magnetic field of a movable magnet displaced by change in tire air pressure and a fixed magnet to cause to change an amount of linkage magnetic flux. Furthermore, the amount of linkage magnetic flux is caused to change by displacement of the movable magnet or slight rotation of the rotating magnet influenced thereby even before the time of rotation.

Consequently, although the amplitude of a compensated signal output from the amplitude-compensating device is interlocked with displacement of the movable magnet prior to signal-voltage change due to large rotation of the rotating magnet, and changes accordingly, it is essentially unchanged by change in vehicle speed (i.e., change in carrier frequency), and as a result of this, displacement of the movable magnet can be detected accurately even prior to large rotation of the rotating magnet.

Furthermore, in an invention according to a fourteenth claim, pneumatic signals can be output in a multiplicity of stages or absolute values thereof can be output, and so the level of air pressure can be known more accurately. Additionally, because tire pneumatic signals corresponding to the amplitude of the output signals of the amplitude-compensating device are displayed in a multiplicity of stages, the driver can easily recognize a lowered state of tire air pressure, and moreover can accurately recognize when tire air pressure has become a predetermined value (for example requiring replenishment of pressure) by rotation of the rotating magnet.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
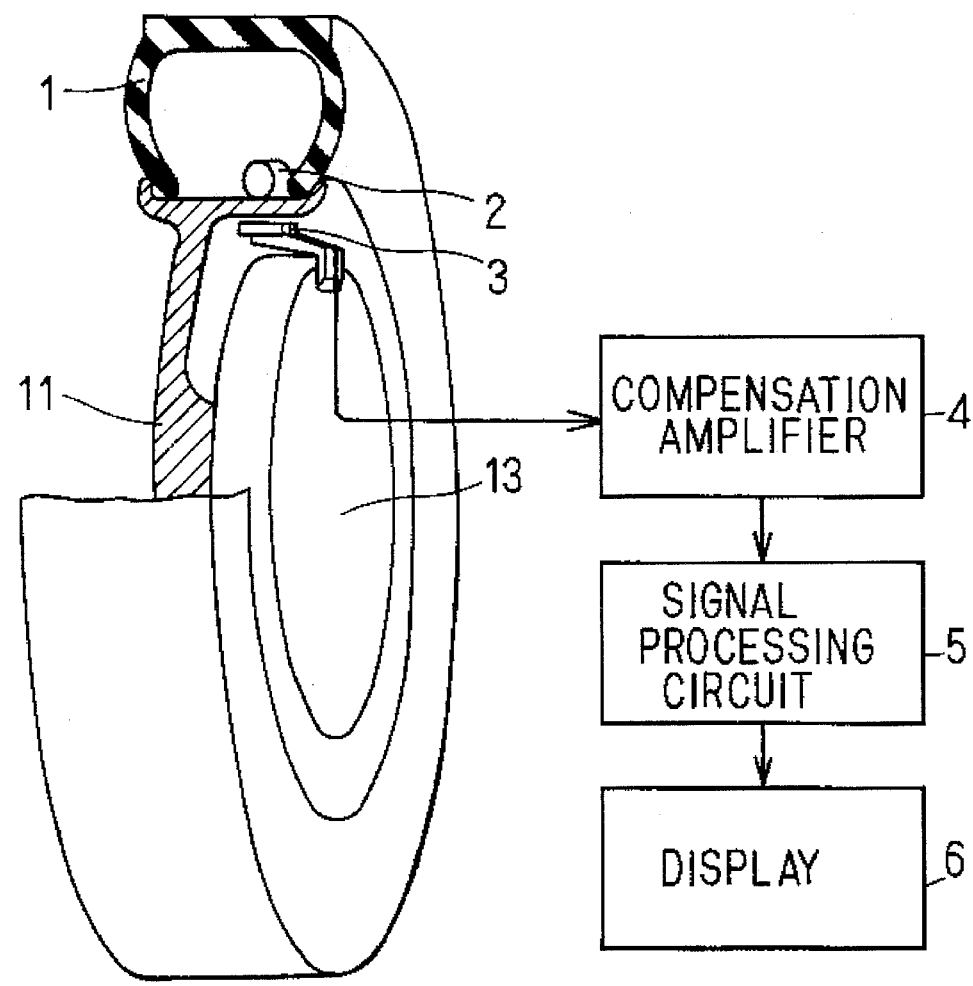
FIG. 1 is a typical perspective view indicating an overall structure of a pneumatic detection apparatus for a tire according to an embodiment of the present invention.

An embodiment of a pneumatic detection apparatus for a tire according to the present invention will be described hereinafter with reference to the drawings. FIG. 1 is a perspective view of the pneumatic detection apparatus for a tire.

A rim 11 of a tire 1 is fixed to an axle (not illustrated), and a hub 13 supporting the axle is supported by a vehicle body (not illustrated) via a shock absorber (not illustrated).

A magnet portion (the magnetic-flux change-generating device in terms of the present invention) 2 of the pneumatic detection apparatus for a tire is fixed to the rim 11, and a pickup coil 3 which is approachable to the magnet portion 2 is fixed to the hub 13.

Output voltage (electromagnetic-induction voltage) Vp of the pickup coil 3 is processed by a compensation amplifier 4 and signal-processing circuit 5 which will be described later, and is displayed in multiple-stage levels as tire air pressure on a display 6.

The magnet portion 2 will be described with reference to FIG. 2.

Two end openings of a cylindrical case 20 are closed by covers 21 and 22, and the covers 21 and 22 have respective shafts 21a and 22a which protrude inwardly along the axial center. A bellows 23 is fitted into the shaft 22a, and a base-end portion of the bellows 23 is fixed to a base of the shaft 22a. A holder 24 is fixed to a tip-end portion of the bellows 23, and the holder 24 is disposed freely slidably over the inner peripheral surface of the cylindrical case 20. A hole into which tire air pressure is introduced is formed in the shaft 22a, and the bellows 23 is thereby urged to expand to the left-hand side of the drawing by tire air pressure. A movable magnet 25 is fixed to the holder 24. Additionally, a spring 26 of which a base end is supported by the shaft 21a urges the holder 24 to the right-hand side of the drawing, and the holder 24 is static at a competitive point of the two foregoing forces.

Meanwhile, a fixed magnet 27 is fitted into the base-end portion of the shaft 21a and fixed, and moreover a rotating magnet 28 is supported freely rotatably and vertically indisplaceably in a central portion of the shaft 21a.

The movable magnet 25, fixed magnet 27, and rotating magnet 28 have respectively a trochal-disk configuration with a thick plate thickness. The movable magnet 25 is magnetized so that the N pole is at the upper side and the S pole is at the lower side in the drawing, and the fixed magnet 27 is magnetized so that the S pole is at the upper side and the N pole is at the lower side in the drawing. The rotating magnet is disposed at a predetermined distance axially from the fixed magnet 27.

Figure 2:
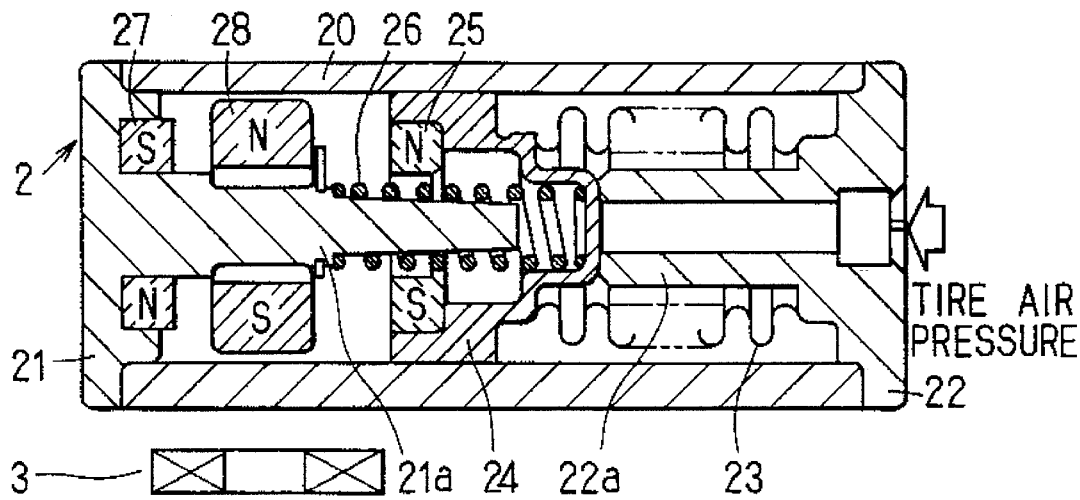
FIG. 2 is a sectional view of a magnet portion 2 in FIG. 1.

In a case where the movable magnet 25 is separated from the rotating magnet 28, the rotating magnet 28 is supported by a magnetic field of the fixed magnet 27 in an attitude whereby the N pole is at the upper side and the S pole is at the lower side as shown in FIG. 2. Meanwhile, when the movable magnet 25 approaches the rotating magnet 28, the magnetic field of the movable magnet 25 comes to be applied more strongly than the magnetic field of the fixed magnet 27 to the rotating magnet 28, and as a result of this the rotating magnet 28 rotates a half-turn and is supported in an attitude whereby the N pole is at the lower side and the S pole is at the upper side in the drawing.

Because the magnet portion 2 rotates together with the tire 1, with each rotation of the tire 1 a portion of magnetic flux which leaks from the magnet portion 2 is linked with the pickup coil 3, and the pickup coil 3 comes to output an alternating-current voltage waveform of one cycle. Accordingly, the configuration of this alternating-current voltage waveform of one cycle comes to vary in 180-degree phase due to the above-described rotation of the rotating magnet 28. That is to say, the positive half-wave and negative half-wave of the alternating-current voltage waveform of one cycle are sequentially inverted. This pneumatic detection apparatus for a tire employs the above-described principle to detect whether tire air pressure has become a predetermined value or less.

Figure 3:
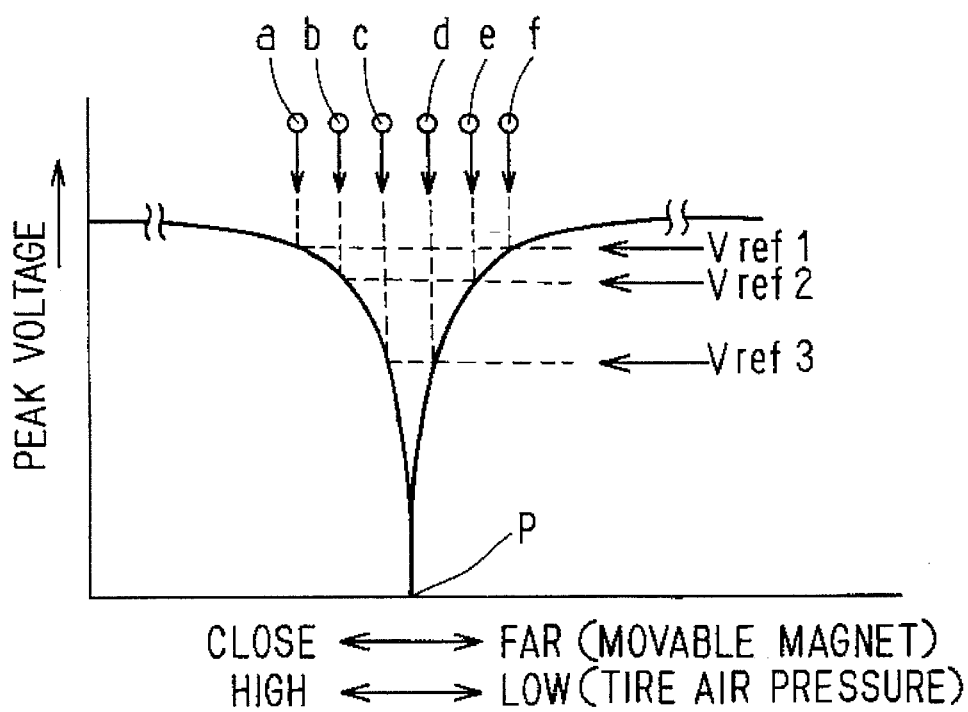
FIG. 3 is a characteristic diagram indicating a relationship between tire pneumatic and peak value of electromagnetic-induction voltage of a pickup coil 3 in FIG. 1.

Next, electromagnetic-induction voltage of the pickup coil 3 will be described further. As shown in FIG. 3, the amount of linkage magnetic flux of the pickup coil 3 decreases along with the decrease in tire air pressure, with the decrease in the amount of magnetic flux leaking from a surface of the rotating magnet 28 toward the pickup coil 3 due to the rotation of the rotating magnet 28 as the cause, and the amount of linkage magnetic flux reaches a minimum at the point where rotation is 90 degrees, and thereafter the amount of linkage magnetic flux again increases. As a result of this, a peak value of electromagnetic-induction voltage at uniform vehicle speed (a half-wave rectified value is also acceptable; in other words, an absolute value) changes while tracking the amount of rotation of the rotating magnet 28, i.e., the pneumatic-voltage change.

Figure 4:
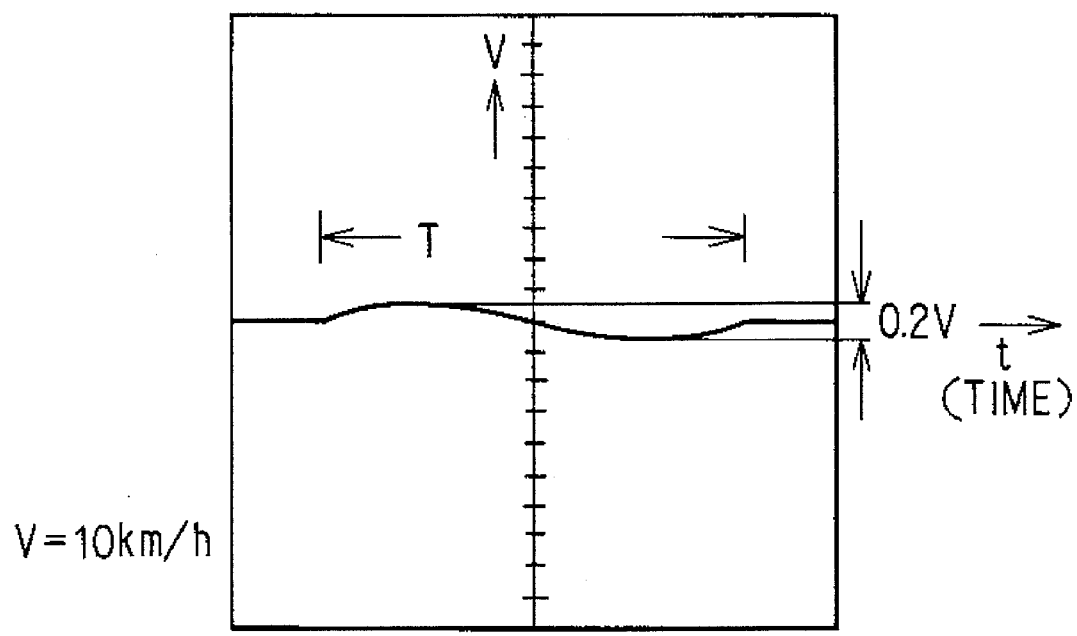
FIG. 4 is a waveform diagram of electromagnetic-induction voltage.
Figure 5:
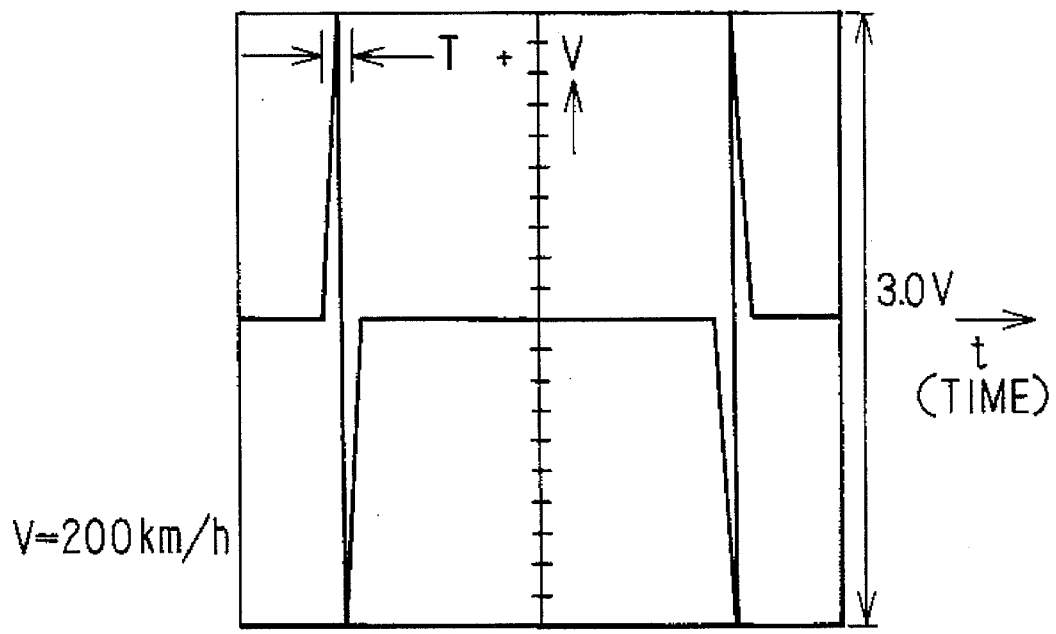
FIG. 5 is another waveform diagram of electromagnetic-induction voltage.

Additionally, the peak value of the electromagnetic-induction voltage of the pickup coil 3 changes substantially in proportion to change in vehicle speed. FIG. 4 indicates a waveform of electromagnetic-induction voltage V at 10 km/h vehicle speed, and FIG. 5 indicates a waveform of electromagnetic-induction voltage V at 200 km/h vehicle speed. Theoretically, the ratio of the peak values of the electromagnetic-induction voltages at the two vehicle speeds becomes 20 times, but because of respective losses it becomes in actuality 0.2 V versus 3.0 V, or 15 times.

When this pneumatic detection apparatus for a tire is caused to operate in a range of 10 km/h to 200 km/h, the tire rotating speed becomes 1.5 rps to 30 rps. According to measurements, the per-cycle time (period) of the electromagnetic-induction voltage of the pickup coil 3 at this case can be views as being 4 ms to 60 ms. Herein, the per-cycle time (period) is taken to be the time between the points at both ends where the electromagnetic-induction voltage becomes one-twentieth of the peak value. In the present specification, the inverse of this per-cycle time is views as the frequency of this electromagnetic-induction voltage (the carrier frequency in terms of the present invention). Accordingly, the carrier frequency becomes 17 Hz to 250 Hz.

Figure 6:
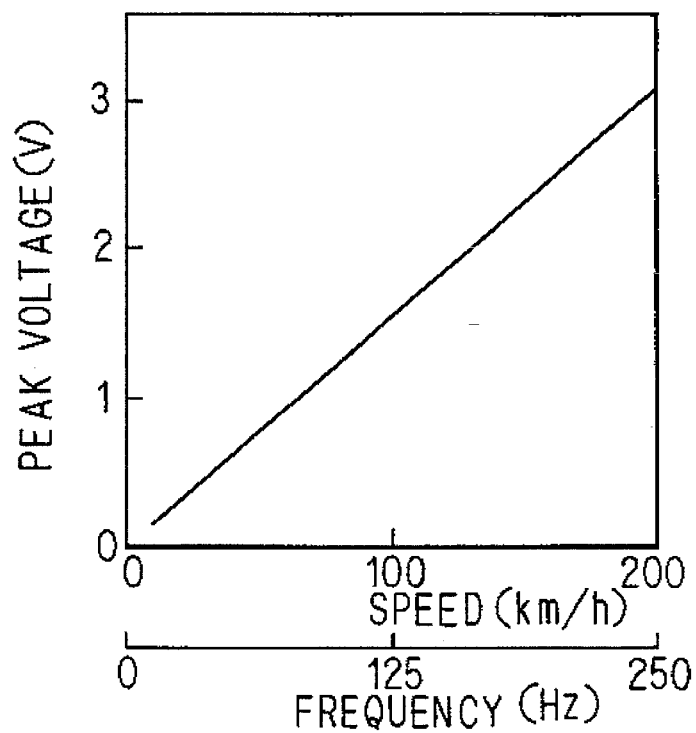
FIG. 6 is a characteristic diagram indicating a relationship between vehicle speed and carrier frequency on the one hand and peak value of electromagnetic-induction voltage on the other.

FIG. 6 indicates measurement results of vehicle speed, i.e., carrier frequency and peak value of electromagnetic-induction voltage. The two values have a substantially positive proportional relationship, as described above.

Figure 7:
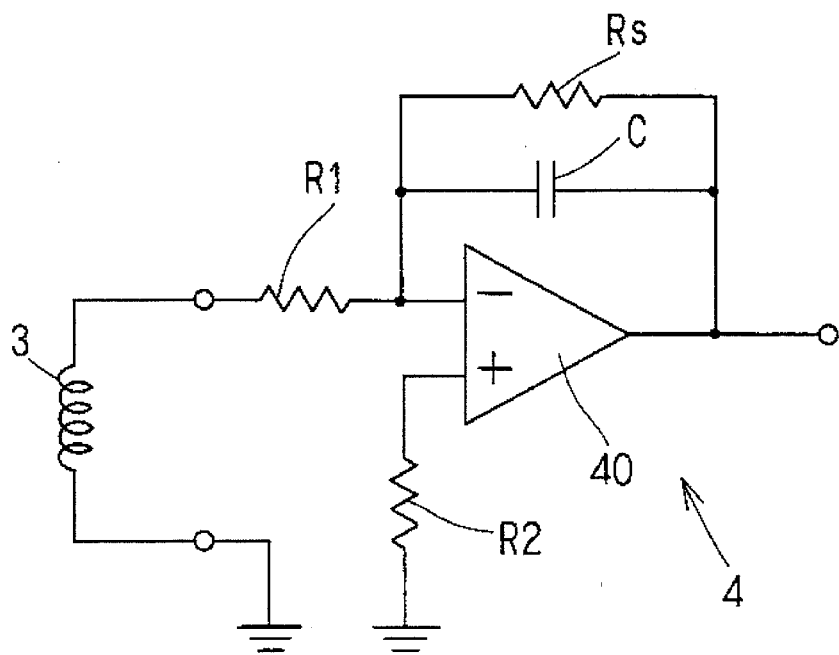
FIG. 7 is a circuit diagram of a compensation amplifier 4.

FIG. 7 indicates a example of an compensation amplifier 4 to improve frequency characteristics of the output voltage of the pickup coil 3.

The compensation amplifier 4 is composed of an op-amp 40, a feedback circuit composed of a parallel circuit of a shunt resistor Rs and feedback capacitor C, an offset-compensation resistor R2 connecting an op-amp 40 "+" input pin and ground, and an input resistor R1 connecting an op-amp 40 "−" input pin and one end of the pickup coil 3. The other end of the pickup coil 3 is grounded. The present embodiment establishes R1 to be 93 KΩ Rs to be 6.3 KΩ and C to be 0.1 µF.

Figure 8:
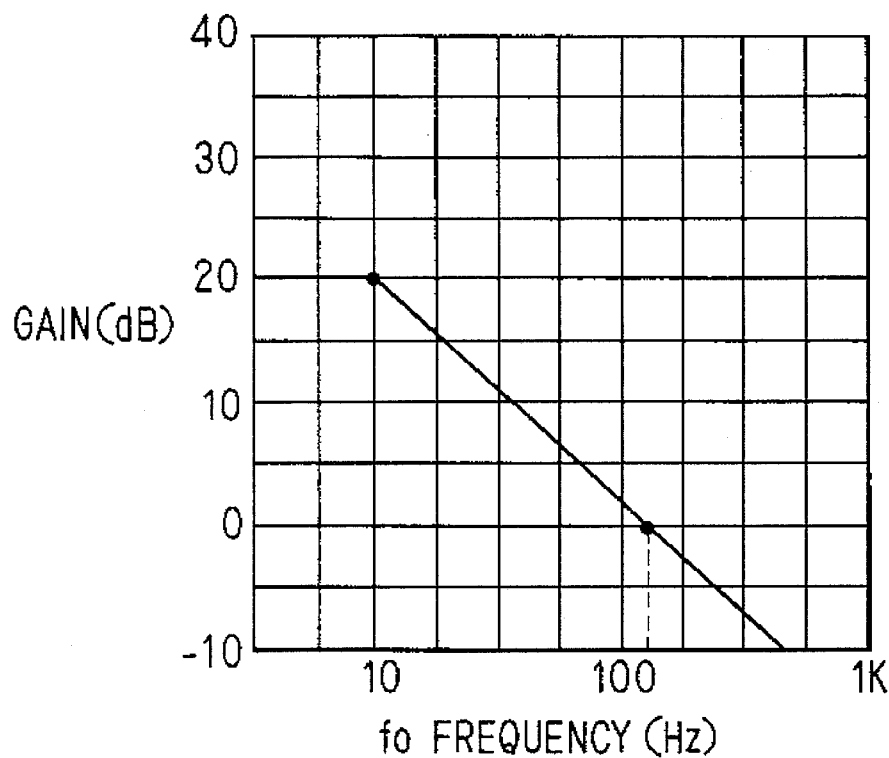
FIG. 8 is a diagram indicating a frequency-gain relationship of the compensation amplifier 4.

The compensation amplifier 4 is an ordinary integrating circuit (low-pass filter), and a direct-current amplification rate thereof is −Rs/R1. As is widely know, this integrating circuit becomes a mere inversion amplifier in a case where a frequency f of input-signal voltage is smaller than fc $=1/(2\pi R_s C)$, and becomes an integrator when the frequency f exceeds fc. According to the present embodiment, as shown in FIG. 8, fc is established at 10 Hz, and the peak value of the compensation amplifier 4 output voltage is taken to be substantially 2 V irrespective of vehicle speed.

That is to say, a band (hereinafter termed "cutoff band") as an integrator of the compensation amplifier 4 overlaps the carrier-signal band, and a signal band (pneumatic-signal band; 0.1 Hz or less) overlaps the band as a linear amplifier of the compensation amplifier 4 (hereinafter termed the "pass band").

In the band as an integrator (i.e., the cutoff band), the compensation amplifier 4 output voltage is substantially inversely proportional to frequency, and so fluctuations in peak value of the electromagnetic-induction voltage V due to the foregoing fluctuations in vehicle speed are compensated so as to obtain substantially no dependency on frequency. With respect to the amount of linkage magnetic flux corresponding to air pressure, however, linear amplification is performed by the amplifier characteristics of the foregoing pass band. Moreover, according to the present embodiment a low-pass filter with an extremely low cutoff frequency is employed as the compensation amplifier 4, and so essentially all various alternating-current noise voltage components (for example, electromagnetic noise inducted to the pickup coil 3) can be cut off, and a tire pneumatic signal having an extremely high S/N ratio as well as an amplitude which does not fluctuate due to vehicle speed can be obtained.

Figure 9:
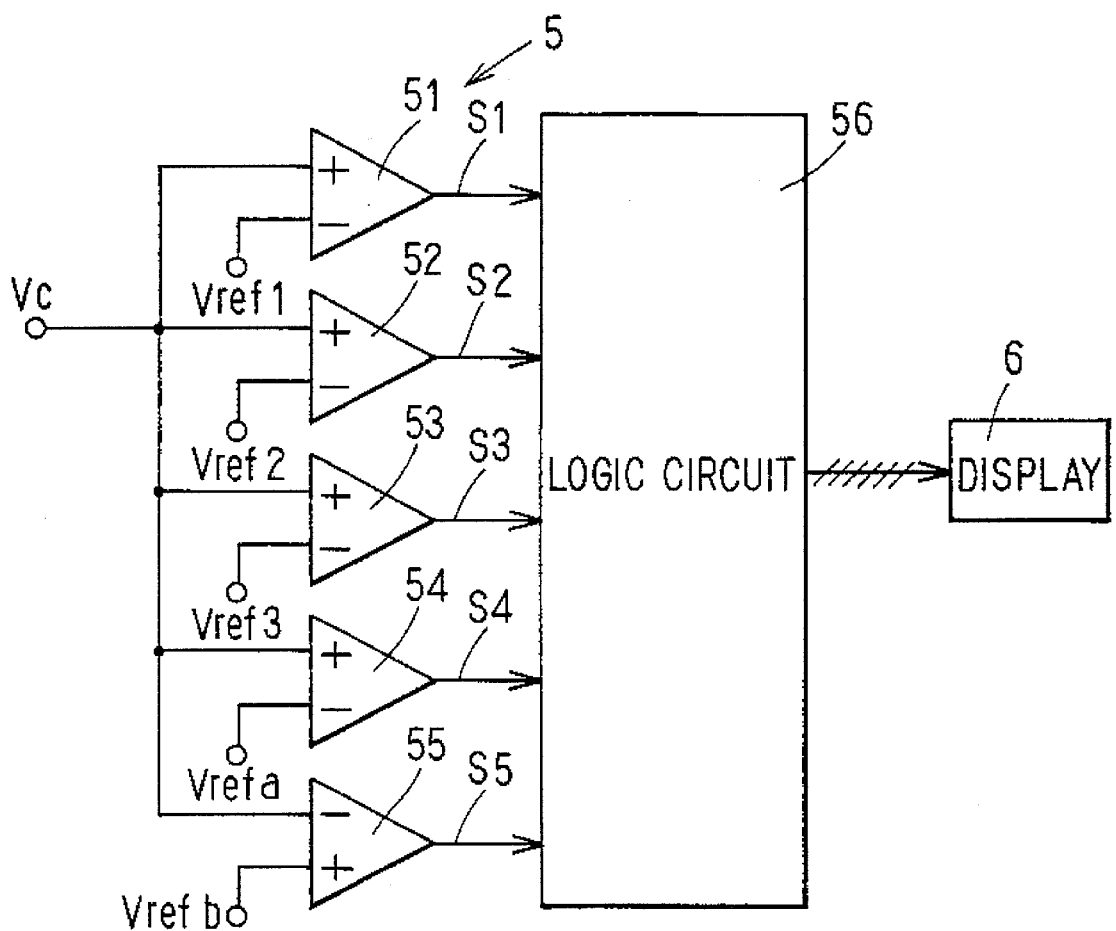
FIG. 9 is a block diagram indicating a schematic structure of a signal-processing circuit 5.

FIG. 9 indicates a signal-processing circuit 5 to process a compensated signal voltage Vc output from the compensation amplifier 4 and output it to a display 6.

The signal voltage Vc is input to comparators 51 to 55, and output signals S1 to S5 thereof are input to a logic circuit 56.

The comparators 54 and 55 are to discriminate before and after rotation of the rotating magnet 28; because the sequence of the positive and negative half-waves of the single-cycle waveform of the electromagnetic-induction voltage are reversed before and after rotation, before and after rotation are determined with this as the discriminant.

The comparator 54 makes the positive half-wave a binary value at a threshold voltage Vrefa, and the comparator 55 makes the negative half-wave a binary value at a threshold voltage Vrefb. The logic circuit 56 outputs high level signal (i.e., before completion of rotation) as a rotation-determination signal in a case where the output voltage S4 appears prior the output voltage S5, and outputs low level signal (i.e., after completion of rotation) in a case where the output voltage S5 appears prior the output voltage S4.

Figure 10:
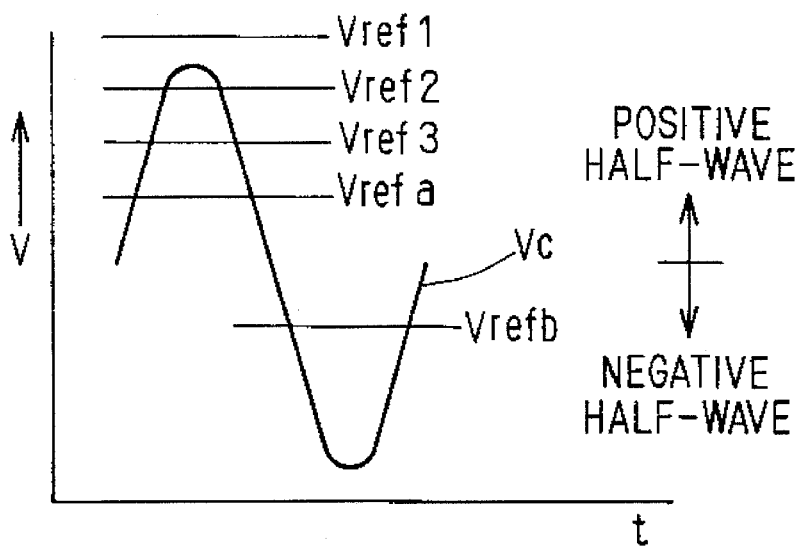
FIG. 10 is a waveform diagram indicating a relationship between an output-voltage waveform of the compensation amplifier 4 and respective threshold values.

Meanwhile, the comparators 51 to 53 are to determine whether the respective peaks of the positive half-waves exceed each threshold value, and thereby determine change in the amount of linkage magnetic flux, i.e., displacement of the movable magnet 25, i.e., change in tire air pressure (see FIGS. 3 and 10).

As shown in FIG. 3, the logic circuit 56 can determine six tire-air values "a" to "f" by the foregoing rotation-determination signal and comparison results S1 to S3 of the comparators 51 to 53, and these six levels are output to a light-emitting display 6 for display in respectively differing colors.

Aside from the above-described low-pass filter, another circuit is acceptable as the compensation amplifier 4 if it has substantially 1/f characteristics in the carrier-frequency band and has a uniform transmission efficiency in the change-frequency band (substantially direct current) of tire air pressure. For example, a variable-gain amplifier which extracts the frequency of the electromagnetic-induction voltage and is controlled at an amplification rate inversely proportional to this frequency may be employed.

Additionally, the foregoing embodiment was described with a tire of an automobile as an example of a moving body, but an internal pressure of a moving body which is not exclusively a tire can be detected in a noncontacting manner by the same method.

Furthermore, the moving body to be detected is naturally not only a body in rotating motion but may be a body in linear motion or a body in nonlinear motion.

What is claimed is:

1. A pneumatic detection apparatus for a tire, comprising:
   pressure detecting means for detecting change in air pressure of a tire as change in magnetic flux;
   signal outputting means for outputting signals which change in accordance with a amount of change of said magnetic flux;
   amplitude compensating means for generating signals compensating for change in said signals from said signal outputting means due to tire rotating speed; and
   discriminating means for discriminating pressure values of said air pressure as a plurality of values, in accordance with said signals from said amplitude compensating means.

2. A pneumatic detection apparatus for a tire according to claim 1, wherein said pressure detecting means has a pressure-sensor portion composed of a first magnet whose position changes in accordance with a change internal pressure of said tire, and a second magnet which has poles whose positions change in accordance with magnetism of said first magnet.

3. A pneumatic detection apparatus for a tire, comprising:
   a sensor to output signals of which frequency and amplitude thereof change in accordance with change in tire air pressure and with tire rotating speed;
   amplitude compensating means for compensating for change in said signal amplitude due to tire rotating speed; and
   discriminating means for discriminating change in tire air pressure from said compensated signals.

4. A pneumatic detection apparatus for a tire according to claim 3, wherein said amplitude compensating means is a frequency filtering means having attenuation characteristics with respect to a predetermined frequency range.

5. A pneumatic detection apparatus for a tire according to claim 4, wherein said frequency filtering means is a low-pass filter.

6. A pneumatic detection apparatus for a tire according to claim 4, wherein said frequency filtering means is a band-pass filter.

7. A pneumatic detection apparatus for a tire according to claim 4, wherein one end of the frequency range of the signals output from said sensor is established at a cutoff frequency of said frequency filtering means.

8. A pneumatic detection apparatus for a tire, comprising:
   a pickup coil disposed on a vehicle;
   magnetic-flux change means installed in a tire to be displaced in accordance with tire air pressure and for causing an amount of magnetic flux, which is linked with said pickup coil, to change in accordance with the displacement;
   amplitude compensating means for attenuating amplitude of electromagnetic induction voltage of alternating current, which is generated at said pickup coil in accordance with the amount of said magnetic flux, at an attenuation rate substantially proportional to a rotating frequency of said tire; and
   discriminating means for discriminating said tire air pressure on a basis of amplitude of said electromagnetic induction voltage compensated by said amplitude compensating means.

9. A pneumatic detection apparatus for a tire according to claim 8, wherein said amplitude compensating means is composed of a low-pass filter, and an attenuation band of said low-pass filter is established so that said rotating frequency of said tire is included within said attenuation band.

10. A pneumatic detection apparatus for a tire according to claim 8, wherein said attenuation rate is established in a range of 0.5K to 2K, when K is a predetermined proportional constant value.

11. A pneumatic detection apparatus for a tire according to claim 8, wherein said amplitude compensating means is composed of an integrating circuit which negatively feeds back output voltage through a parallel feedback circuit of a shunt resistance Rs and a return capacitance C, and a parameter fc, where $fc=1/(2\pi RsC)$, is established at a value smaller than said rotating frequency.

12. A pneumatic detection apparatus for a tire, comprising:
- a fixed magnet;
- a movable magnet facing said fixed magnet and of which an interval with said fixed magnet interposed therebetween changes in accordance with change in tire air pressure;
- a rotating magnet which is positioned between said fixed magnet and said moveable magnet and is supported freely rotatably, and which is rotated by displacement of said movable magnet, wherein said rotating magnet causes a pickup coil to generate an electromagnetic-induction signal having frequency corresponding to vehicle speed and amplitude corresponding to said vehicle speed and said displacement;
- amplitude compensating means for compensating change in amplitude of said electromagnetic-induction signal due to said vehicle speed; and
- discriminating means for discriminating said tire air pressure on a basis of amplitude of said electromagnetic-induction signal compensated by said amplitude compensating means.

13. A pneumatic detection apparatus for a tire according to claim 12, wherein said amplitude compensating means is a frequency filtering means having attenuation characteristics with respect to a predetermined frequency range.

14. A pneumatic detection apparatus for a tire according to claim 12, further comprising:
- comparing means for comparing a tire air-pressure signal corresponding to an amplitude of an output signal of said amplitude compensating means with a plurality of threshold values; and
- displaying means for displaying comparison results according to said comparing means.

* * * * *